US012567162B2

(12) United States Patent　　　(10) Patent No.:　US 12,567,162 B2
Guay et al.　　　　　　　　　　(45) Date of Patent:　Mar. 3, 2026

(54) REAL-TIME MATTING SYSTEM

(71) Applicant: DISNEY ENTERPRISES, INC.,
Burbank, CA (US)

(72) Inventors: Martin Guay, Unterengstringen (CH);
Tunc Ozan Aydin, Zurich (CH);
Mattia Gustavo Bruno Paolo Ryffel,
Bidogno (CH)

(73) Assignee: DISNEY ENTERPRISES, INC.,
Burbank, CA (US)

( * ) Notice: Subject to any disclaimer, the term of this
patent is extended or adjusted under 35
U.S.C. 154(b) by 397 days.

(21) Appl. No.: 18/185,266

(22) Filed: Mar. 16, 2023

(65) Prior Publication Data

US 2024/0312035 A1　　Sep. 19, 2024

(51) Int. Cl.
G06T 7/50　　　(2017.01)
G06T 5/50　　　(2006.01)
G06T 7/194　　　(2017.01)
G06V 10/70　　　(2022.01)

(52) U.S. Cl.
CPC .................. G06T 7/50 (2017.01); G06T 5/50
(2013.01); G06T 7/194 (2017.01); G06V 10/70
(2022.01); *G06T 2207/20221* (2013.01)

(58) Field of Classification Search
CPC ........... G06T 7/50; G06T 17/194; G06T 5/50;
G06T 2207/20221; G06V 10/70
See application file for complete search history.

(56) References Cited

U.S. PATENT DOCUMENTS

| | | | |
|---|---|---|---|
| 8,320,666 B2 | 11/2012 | Gong | |
| 10,574,905 B2 | 2/2020 | Srikanth et al. | |
| 10,810,752 B2 * | 10/2020 | Angelova | G06T 7/285 |
| 10,839,577 B2 * | 11/2020 | Horie | G06T 3/4053 |
| 10,860,836 B1 * | 12/2020 | Tyagi | G06N 3/084 |

(Continued)

FOREIGN PATENT DOCUMENTS

| | | |
|---|---|---|
| CN | 110942018 A | 3/2020 |
| CN | 215833949 U | 2/2022 |

OTHER PUBLICATIONS

Wang et al., "Automatic Real-Time Video Matting Using Time-of-Flight Camera and Multichannel Poisson Equations", International Journal of Computer Vision, DOI 10.1007/s11263-011-0471-x, vol. 97, May 23, 2011, pp. 104-121.

(Continued)

*Primary Examiner* — Gregory M Desire

(74) *Attorney, Agent, or Firm* — Squire Patton Boggs LLP; Sarah Mirza

(57)　　　　　ABSTRACT

The disclosed matting technique comprises receiving a video feed comprising a plurality of temporally ordered video frames as the video frames are captured by a video capture device, generating, using one or more machine learning models, an image mask corresponding to each video frame included in the video feed and a depth estimate corresponding to each video frame included in the video feed, and, for each video frame in the video feed, transmitting, in real-time, the video frame, the corresponding image mask, and the corresponding depth estimate to a compositing system. The compositing system composites a computer-generated element with the video frame based on the corresponding image mask and the corresponding depth estimate.

20 Claims, 6 Drawing Sheets

(56)  References Cited

U.S. PATENT DOCUMENTS

| | | | |
|---|---|---|---|
| 10,984,545 B2 * | 4/2021 | Gu | G06N 20/10 |
| 11,037,051 B2 * | 6/2021 | Kim | G06F 18/21 |
| 11,315,274 B2 * | 4/2022 | Dekel | G06T 7/579 |
| 11,393,100 B2 * | 7/2022 | Zhang | G06T 3/40 |
| 11,481,913 B2 * | 10/2022 | Deegan | G06N 3/045 |
| 11,688,070 B2 * | 6/2023 | Goren | G06V 10/454 |
| | | | 382/156 |
| 11,798,183 B2 * | 10/2023 | Zhu | G05D 1/0221 |
| 12,080,010 B2 * | 9/2024 | Watson | G06T 7/55 |
| 12,243,145 B2 * | 3/2025 | Cole | G06V 10/82 |
| 2021/0225037 A1 | 7/2021 | Aydin et al. | |

OTHER PUBLICATIONS

Wei et al., "Improved Image Matting via Real-time User Clicks and Uncertainty Estimation", Conference on Computer Vision and Pattern Recognition, 2021, pp. 15374-15383.
Lin et al., "Real-Time High-Resolution Background Matting", arXiv:2012.07810, Dec. 14, 2020, pp. 1-16.

* cited by examiner

500

Receive a video feed from a video capture device
502

Generate, for each of the one or more frames, a corresponding image mask and a corresponding depth estimate
504

Perform one or more post processing operations on the image mask and/or the depth estimate
506

Transmit the image mask and the depth estimate to a compositing system to generate one or more composite frames
508

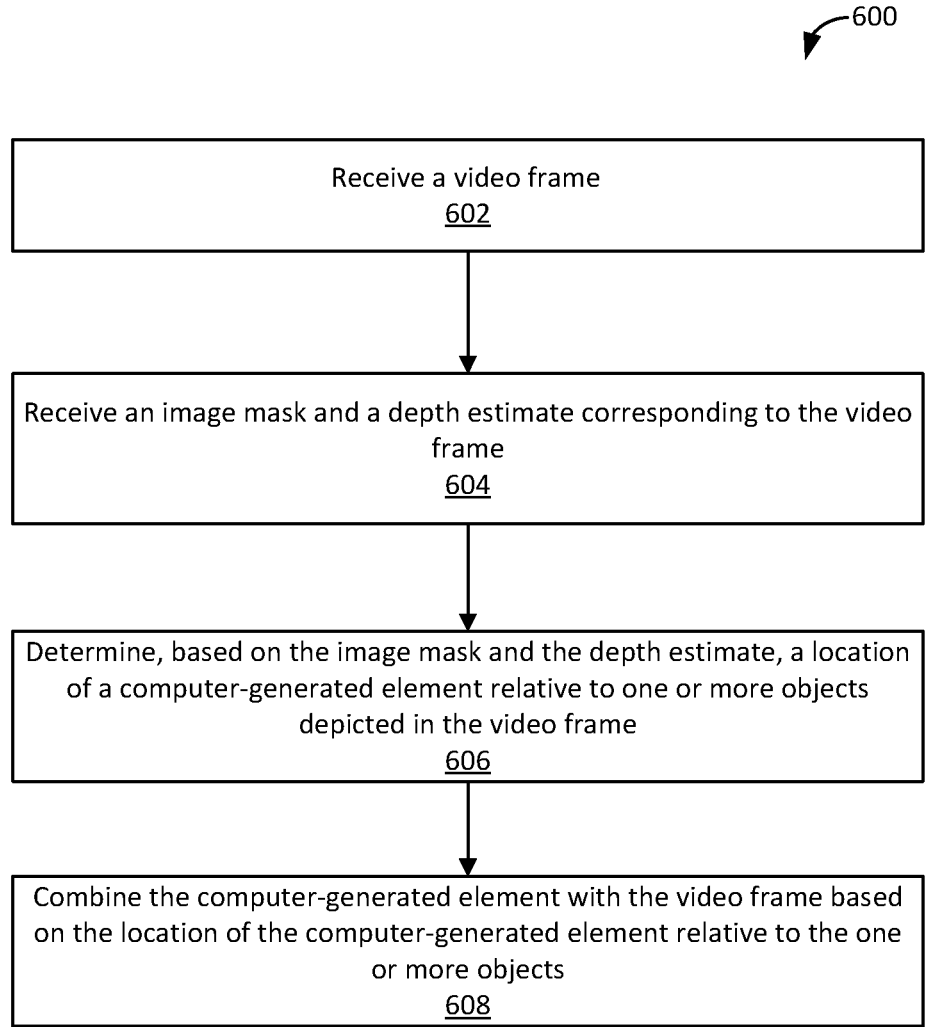

600

Receive a video frame
602

Receive an image mask and a depth estimate corresponding to the video frame
604

Determine, based on the image mask and the depth estimate, a location of a computer-generated element relative to one or more objects depicted in the video frame
606

Combine the computer-generated element with the video frame based on the location of the computer-generated element relative to the one or more objects
608

FIG. 6

REAL-TIME MATTING SYSTEM

BACKGROUND

Field of the Various Embodiments

Embodiments of the present disclosure relate generally to computer science and video processing and, more specifically, to a real-time matting system.

Description of the Related Art

Oftentimes, live-action video footage of an actor needs to be composed with one or more computer-generated elements, such as a virtual character, virtual object, background, and/or the like. For example, the background of the live-action video footage could be replaced with a computer-generated background. As another example, a computer-generated character could be added to a scene such that the actor appears to interact with the computer-generated character.

One approach for composing live-action video footage with computer-generated elements is to use a green screen or motion capture volumes. However, green screens and motion capture both require expensive equipment and complex setups. Additionally, processing live-action video footage that utilizes green screen and/or motion capture requires significant processing power and time. Accordingly, using these approaches, a composite video cannot be quickly reviewed in order to make changes to the live-action footage while filming.

Another approach is to utilize software applications that can add computer-generated elements to video or images captured on a personal device, such as a mobile phone or computer webcam. However, the software applications are usually only able to modify video or images captured while executing the software application (e.g., webcam feed while using a video conferencing application). Accordingly, the software applications cannot be integrated with other devices (e.g., professional video equipment), applications, and/or computer-generated elements that are used in a film production pipeline.

As the foregoing illustrates, what is needed in the art are more effective techniques for combining live-action video with computer-generated elements.

SUMMARY

One or more embodiments comprises computer-implemented method for compositing a video frame with one or more computer-generated elements. The method comprises receiving a video feed comprising a plurality of temporally ordered video frames as the video frames are captured by an imaging device and generating, using one or more machine learning models, an image mask corresponding to each video frame included in the video feed and a depth estimate corresponding to each video frame included in the video feed. The method further comprises, for each frame in the video feed, transmitting, in real-time as the frame and the corresponding image mask, and the corresponding depth estimate are available, the frame, the corresponding image mask, and the corresponding depth estimate to a compositing system. The compositing system composites a computer-generated element with the frame based on the corresponding image mask and the corresponding depth estimate.

At least one technical advantage of the disclosed techniques relative to the prior art is that the disclosed techniques can more effectively compose live-action video with computer-generated elements. In particular, by inputting a live-action video feed into a trained machine learning model, a matting system is able to generate a corresponding image mask and depth estimate feed in real-time. As a result, using the disclosed techniques, the matting system is able to generate a composite video that combines the live-action video feed with computer-generated elements in real-time while the live-action video feed is being captured. Accordingly, as filmmakers are filming a scene, the filmmakers have an opportunity to view the composite video in real-time, enabling, among other things, the filmmaker to make adjustments in real-time to the scene. Additionally, in contrast to prior approaches that utilize specialized equipment, additional cameras, and equipment or software calibration in order to generate the composite video, the matting system can include only the computing device on which the trained machine learning model is executing. Accordingly, the matting system can be flexibly and easily used in conjunction with different production setups.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 6 is a flow diagram of method steps for processing a video feed to compose the video feed with one or more computer-generated elements, according to various embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
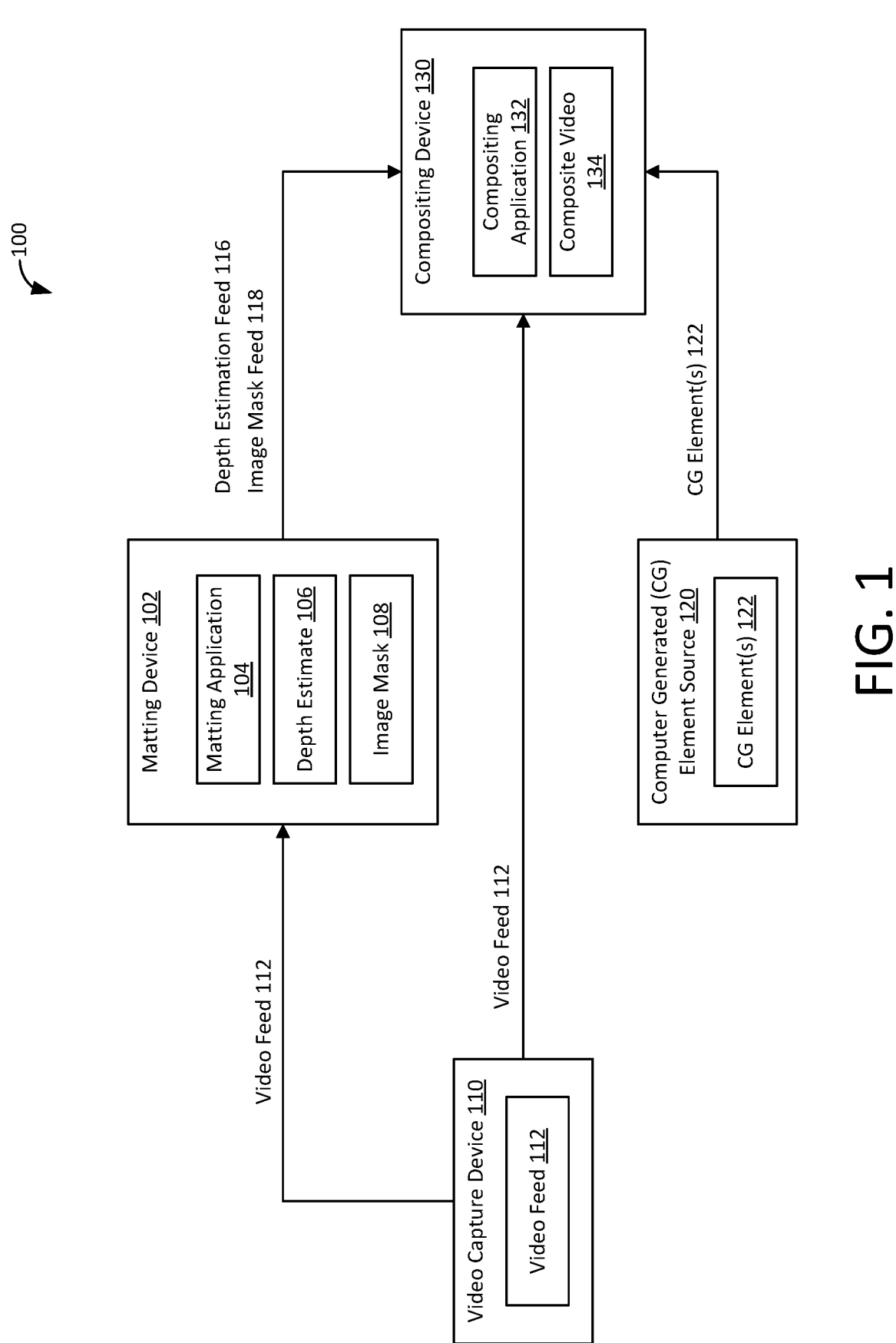
FIG. 1 illustrates an example matting system, according to various embodiments.

FIG. 1 illustrates an example matting system 100, according to various embodiments. As shown in FIG. 1, matting system 100 includes a matting device 102, a video capture device 110, a computer generated (CG) element source 120, and a compositing device 130 (also referred to herein as a "compositing system").

The matting device 102 is configured to receive a video feed 112 captured by the video capture device 110 and generate a depth estimation feed 116 and an image mask feed 118 based on the video feed 112. In various embodiments, the video feed 112 comprises a series of temporally ordered frames (referred to herein as "video frames" or "image frames") captured by the video capture device 110. In various embodiments, a video frame may be represented by a bitmap image that includes three color channels, each of which represents the amount of red, green, or blue in the image.

The matting device 102 includes a matting application 104. The matting application 104 processes the video feed 112 to generate one or more depth estimates 106 and one or more image masks 108. In some embodiments, the matting application 104 generates a corresponding depth estimate 106 and a corresponding image mask 108 for each video frame included in video feed 112. A depth estimate 106 indicates, for a corresponding video frame, the depth of one or more other objects depicted in the video frame (e.g., a person) relative to the scene depicted in the video frame. In some embodiments, the depth estimate 106 is an estimated distance of the one or more objects from the video capture device 110. An image mask 108 indicates, for a corresponding video frame, the portion(s) of the corresponding video frame that depict the one or more objects. In various embodiments, the image mask 108 defines where an image is opaque or transparent. Opaque regions of the one or more objects are white, semi-transparent regions are gray, and transparent regions are black.

The matting device 102 outputs the one or more depth estimates 106 in a depth estimation feed 116 and outputs the one or more image masks 108 in an image mask feed 118. The depth estimation feed 116 and the image mask feed 118 are transmitted to the compositing device 130.

Compositing device 130 receives, as inputs, the video feed 112 from the video capture device 110 or the matting device 102, the depth estimation feed 116 from the matting device 102, and the image mask feed 118 from the matting device 102. The compositing device 130 also receives one or more computer-generated (CG) elements 122 from a CG element source 120. The CG element source 120 can be any suitable data source that generates and/or stores CG elements 122, such as a computing device used to generate computer-generated elements, a storage device included in compositing device 130, a storage device or storage system accessible by compositing device 130, a cloud computing system, and/or the like. The CG elements 122 can be a virtual character, a background, or a virtual object.

As shown, the compositing device 130 includes a compositing application 132. In various embodiments, the compositing application 132 is a software application. In other embodiments, the functionality of the compositing application 132 is implemented in hardware. Furthermore, the compositing application 132 may be integrated into or operate as part of a gaming engine.

As explained in further detail below, the compositing application 132 is configured to combine the video feed 112, the depth estimation feed 116, the image mask feed 118, and the one or more CG elements 122 to generate a composite video 134. In various embodiments, the compositing application 132 generates the composite video feed 134 in real-time, such that each frame in the video feed 112 is augmented in-real time with the one or more CG elements 122 based on the corresponding depth estimate and image mask in the depth estimation feed 116 and the image mask feed 118, respectively. The composite video 134 incorporates the one or more CG elements 122 in the video feed 112 while accounting for the position and location of objects captured in the video feed 112. For example, if a given CG element 122 is included in the background of a scene and a person is in the foreground of the scene, then in the composite video 134, the image of the person would obscure any portion of the given CG element 122 that overlaps with the image of the person.

Figure 2:
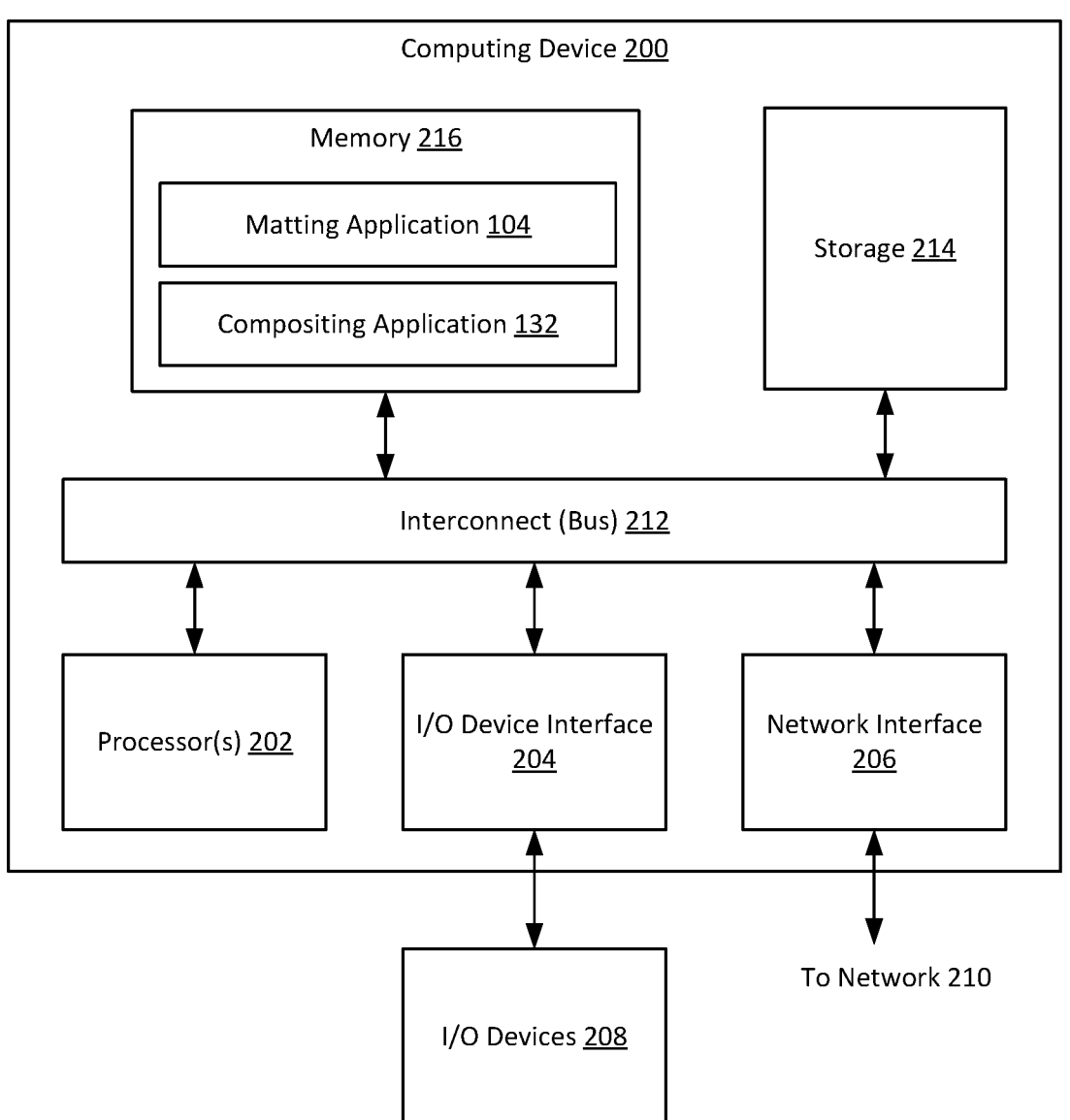
FIG. 2 illustrates a computing device configured to implement one or more aspects of various embodiments.

FIG. 2 illustrates a computing device 200 configured to implement one or more aspects of various embodiments. In some embodiments, the matting device 102 and the compositing device 130 are implemented using the same computing device 200. In some embodiments, the matting device 102 is implemented using a first computing device 200 and the compositing device 130 is implemented using a second computing device 200 that is different from the first computing device 200.

As shown, a computing device 200 includes an interconnect (bus) 212 that connects one or more processor(s) 202, an input/output (I/O) device interface 204 coupled to one or more input/output (I/O) devices 208, memory 216, a storage 214, and a network interface 206 connected to a network 210.

The computing device 200 includes a server computer, a desktop computer, a laptop computer, a smart phone, a personal digital assistant (PDA), tablet computer, or any other type of computing device configured to receive input, process data, and optionally display images, and is suitable for practicing one or more embodiments. The computing device 200 described herein is illustrative and that any other technically feasible configurations fall within the scope of the present disclosure.

The processor(s) 202 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, the processor(s) 202 may be any technically feasible hardware unit capable of processing data and/or executing software applications. Further, in the context of this disclosure, the computing elements shown in the computing device 200 may correspond to a physical computing system (e.g., a system in a data center) or may be a virtual computing embodiment executing within a computing cloud.

In one embodiment, the I/O devices 208 include devices capable of providing input, such as a keyboard, a mouse, a touch-sensitive screen, and so forth, as well as devices capable of providing output, such as a display device. Additionally, the I/O devices 208 may include devices capable of both receiving input and providing output, such as a touchscreen, a universal serial bus (USB) port, and so forth. The I/O devices 208 may be configured to receive various types of input from an end-user (e.g., a designer) of the computing device 200, and to also provide various types of output to the end-user of the computing device 200, such as displayed digital images or digital videos or text. In some embodiments, the one or more of I/O devices 208 are configured to couple the computing device 200 to a network 210.

The network 210 includes any technically feasible type of communications network that allows data to be exchanged between the computing device 200 and external entities or devices, such as a web server or another networked computing device. For example, the network 210 may include a wide area network (WAN), a local area network (LAN), a wireless (WiFi) network, and/or the Internet, among others.

The storage 214 includes non-volatile storage for applications and data, and may include fixed or removable disk drives, flash memory devices, and CD-ROM, DVD-ROM, Blu-Ray, HD-DVD, or other magnetic, optical, or solid-state storage devices. The matting application 104 and/or the compositing application 132 may be stored in the storage 214 and loaded into the memory 216 when executed.

The memory 216 includes a random-access memory (RAM) module, a flash memory unit, or any other type of memory unit or combination thereof. The processor(s) 202, the I/O device interface 204, and the network interface 206 are configured to read data from and write data to the memory 216. The memory 216 includes various software programs that can be executed by the processor(s) 202 and application data associated with said software programs, including the matting application 104 and the compositing application 132. Matting application 104 and compositing application 132 are described in further detail below with respect to FIGS. 2 and 3, respectively.

It will be appreciated that the system shown herein is illustrative and that variations and modifications are possible. Although FIG. 2 illustrates matting application 104 and compositing application 132 executing on the same computing device 200, in various embodiments, matting application 104 and compositing application 132 execute on different computing devices. Further, the functionality included in any of matting application 104 and compositing application 132 can be divided across any number of applications or other software that are stored and execute via any number of devices that are located in any number of physical locations. For example, a first machine learning model could be trained to generate image masks and a second machine learning model could be trained to generate depth estimates. Each machine learning model could execute on a different computing device.

Figure 3:
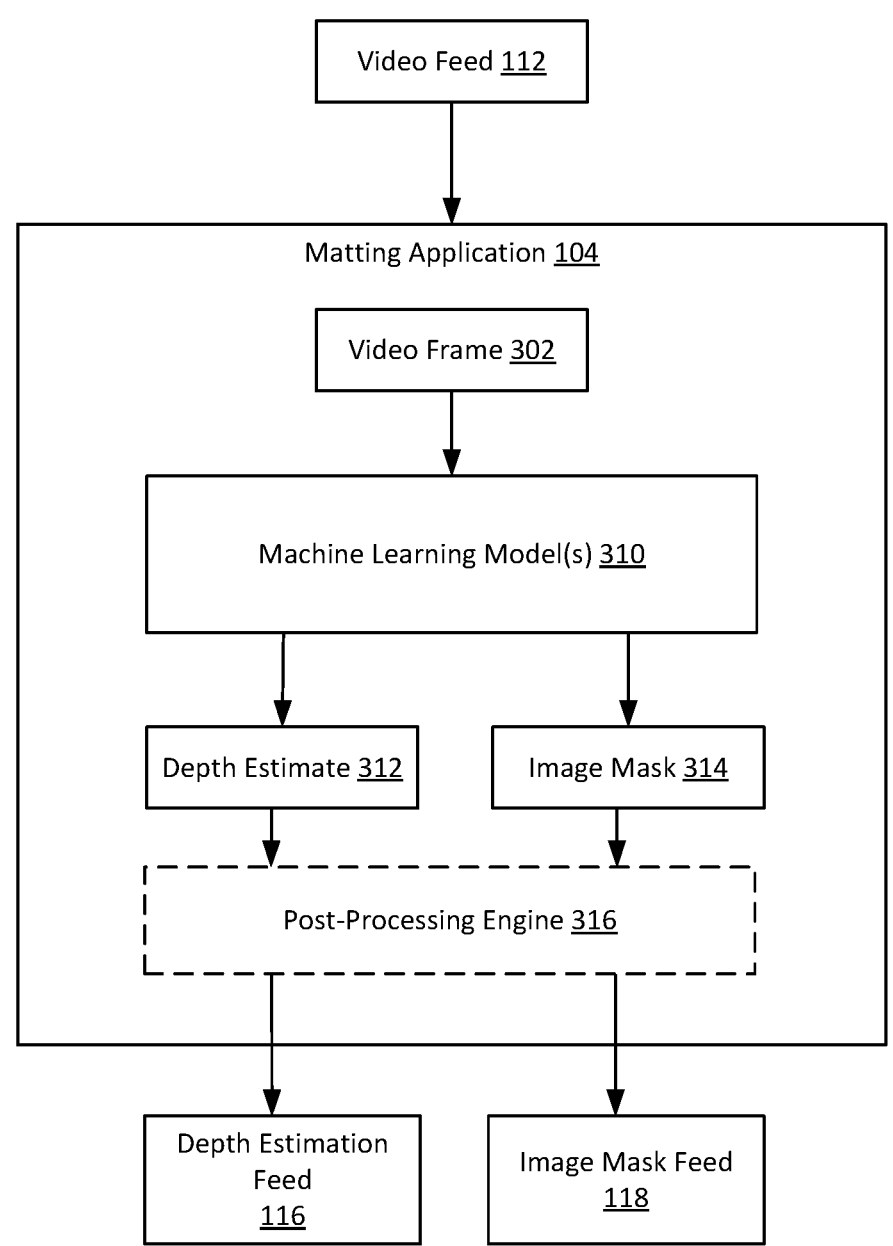
FIG. 3 is a more detailed illustration of the matting application of FIGS. 1 and 2, according to various embodiments.

FIG. 3 is a more detailed illustration of the matting application 104 of FIGS. 1 and 2, according to various embodiments. As shown, matting application 104 includes one or more machine learning model(s) 310. For each video frame 302 included in video feed 112, machine learning model(s) 310 generate a corresponding depth estimate 312 and image mask 314. The depth estimate 312 is output to the compositing device 130 in the real-time as a part of the depth estimation feed 116. Similarly, the image mask 314 is output to the compositing device 130 in real-time as a part of the image mask feed 118.

Machine learning model(s) 310 is a set of trained models that operate on a video frame 302 and, in turn, generate the corresponding depth estimate 312 and image mask 314. In some embodiments, machine learning model(s) 310 are trained on a large training data set of video frames and corresponding depth estimates and masks. In various embodiments, a single machine learning model 310 generates both the depth estimate 312 and image mask 314 based on the video frame 302. In other embodiments, different machine learning model(s) 310 process the video frame 302 to separately generate depth estimate 312 and image mask 314. As described above, the depth estimate 312 corresponding to a given video frame 302 indicates the depth of one or more other objects depicted in the video frame (e.g., a person) relative to the scene depicted in the video frame. The image mask 314 corresponding to the given video frame indicates the portion(s) of the corresponding video frame that depict the one or more objects.

In various embodiments, machine learning model(s) 310 may include one or more recurrent neural networks (RNNs), convolutional neural networks (CNNs), deep neural networks (DNNs), deep convolutional networks (DCNs), residual neural networks (ResNets), graph neural networks, autoencoders/decoders, transformer neural networks, deep stereo geometry networks (DSGNs), stereo R-CNNs, and/or other types of artificial neural networks or components of artificial neural networks. Machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

In various embodiments, an optional post-processing engine 316 performs one or more operations on the depth estimate 312 and/or the image mask 314 prior to outputting the depth estimate 312 or the image mask 314 to the depth estimation feed 116 or the image mask feed 118, respectively. For example, the post-processing engine 316 could perform one or more calibration operations on the depth estimate 312 to calibrate the distances determined in the depth estimate 312. In addition, the post-processing engine 316 could determine a scaling factor associated with the depth estimate 312 based on the positions of known objects in the scene depicted in the corresponding image. With respect to the image mask 314, the post-processing engine 316 could perform one or more edge refinement operations to refine the edges of the image mask. Further, the post-processing engine 316 could perform one or more mask eroding/expanding operations to shrink or expand the edges in of the image mask.

Figure 4:
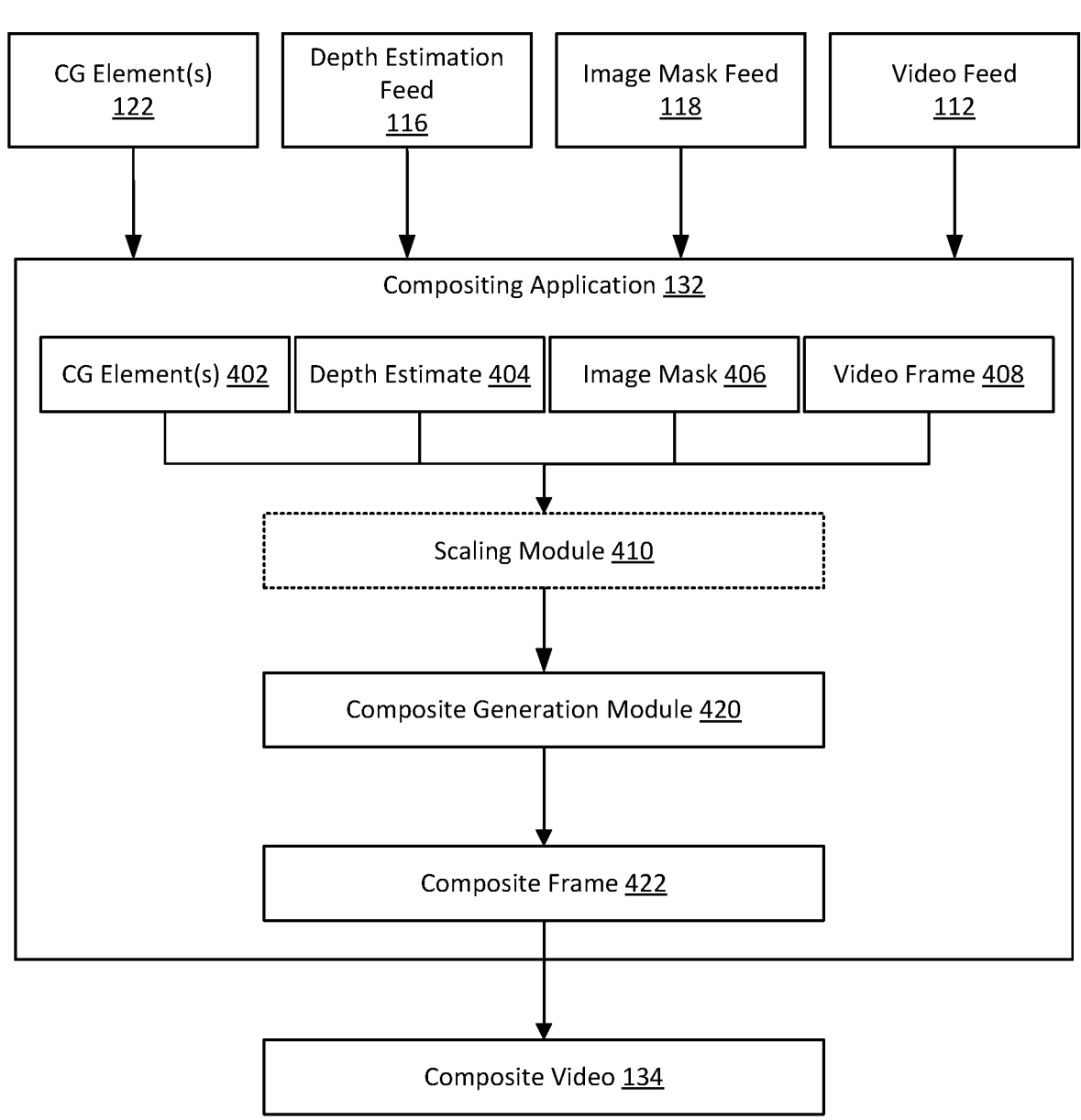
FIG. 4 is a more detailed illustration of the compositing application of FIGS. 1 and 2, according to various embodiments.

FIG. 4 is a more detailed illustration of the compositing application 132 of FIGS. 1 and 2, according to various embodiments. As shown, the compositing application 132 includes CG element(s) 402, depth estimate 404, image mask 406, and video frame 408. In various embodiments, video frame 408 corresponds to video frame 302 discussed above in conjunction with FIG. 3.

As discussed above, the compositing application 132 receives CG element(s) 122 from the CG element source 120, the depth estimation feed 116 and the image mask feed 118 from the matting device 102, and the video feed 112 from the video capture device 110 or the matting device 102 in real-time. CG element(s) 402, depth estimate 404, and image mask 406 are included in those inputs and correspond to the single video frame 408 included in the video feed 112.

In operation, a scaling module 410 optionally scales one or more of the CG element(s) 402, the image mask 406, or the video frame 408. Scaling enables the CG element(s) 402 to be appropriately sized relative to the one or more objects in the scene depicted in video frame 408. The composite generation module 420 processes the CG element(s) 402, the depth estimate 404, the image mask 406, and the video frame 408 to generate a composite frame 422. The composite frame 422 incorporates the CG element(s) 402 into the video frame 408.

The composite generation module 420 determines the placement and appearance of the CG element(s) 402 based on the depth estimate 404 and the image mask 406. For example, if a given CG element 402 is included in the background of a scene and a person is in the foreground of the scene, then in the composite frame 422, the image of the person would obscure any portion of the given CG element 402 that overlaps with the image of the person. Similarly, if a given CG element 402 is included in the foreground of a scene and a person is in the background of the scene, then in the composite frame 422, the CG element 402 would obscure any portion of the person that overlaps with the CG element 402.

The composite generation module 420 combines the CG element(s) 402 with the video frame 408 to generate a composite video frame 422. In various embodiments, the composite video frames generated by the composite generation module 420 are transmitted in real-time to a display device for presentation as the composited video frames are generated. In various embodiments, the composited video frames are stored in a storage device.

Figure 5:
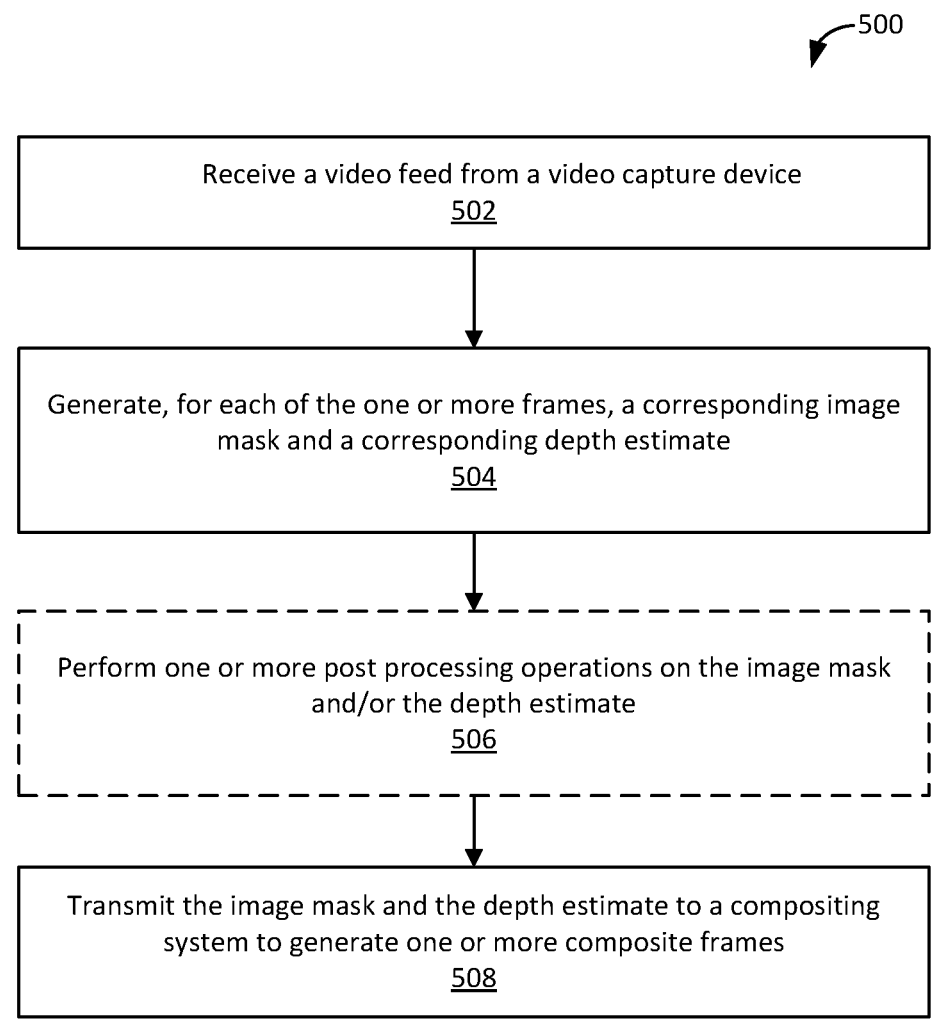
FIG. 5 is a flow diagram of method steps for processing a video feed to generate an image mask and a depth estimate, according to various embodiments.

FIG. 5 is a flow diagram 500 of method steps for processing a video feed to generate an image mask and a depth estimate, according to various embodiments. Although the method steps are described in conjunction with the systems of FIGS. 1-4, persons skilled in the art will understand that any system configured to perform the method steps in any order falls within the scope of the present disclosure.

At step 502, the matting application 104 receives a video feed from a video capture device, such as video capture device 110. The video feed comprises a series of video frames, where each video frame is composed of red, green, and blue color channels.

At step 504, the matting application 104 generates, for each of the one or more frames included in the video feed, a corresponding depth estimate and image mask. The depth estimate corresponding to a given video frame indicates the depth of one or more other objects depicted in the video frame (e.g., a person) relative to the scene depicted in the video frame. The image mask corresponding to the given video frame indicates the portion(s) (e.g., pixels or regions of pixels) of the corresponding video frame that depict the one or more objects.

At step 506, the matting application 104, optionally, performs one or more post processing operations on the depth estimate 312 and/or the image mask 314 prior to outputting the depth estimate 312 or the image mask 314 to the depth estimation feed 116 or the image mask feed 118, respectively. For example, the post-processing engine 316 could perform one or more calibration operations on the depth estimate 312 to calibrate the distances determined in the depth estimate 312. In addition, the post-processing engine 316 could determine a scaling factor associated with the depth estimate 312 based on the positions of known objects in the scene depicted in the corresponding image. With respect to the image mask 314, the post-processing engine 316 could perform one or more edge refinement operations to refine the edges of the image mask. Further, the post-processing engine 316 could perform one or more mask eroding/expanding operations to shrink or expand the edges in of the image mask. In some implementations, step 506 may be omitted.

At step 508, the matting application 104 transmits, in real-time, the image mask(s) and the depth estimate(s) corresponding to the video frame(s) included in the video feed to the compositing device 130. The compositing device 130 processes the image mask(s) and the depth estimate(s) in conjunction with the corresponding video frames to generate one or more composite frames. In various embodiments, the matting application 104 outputs the image mask and the depth estimate generated for a given video frame in image mask feed and a depth estimate feed in real-time.

FIG. 6 is a flow diagram 600 of method steps for processing a video feed to compose a composite video feed including the video feed and one or more computer-generated elements, according to various embodiments. Although the method steps are described in conjunction with the systems of FIGS. 1-4, persons skilled in the art will understand that any system configured to perform the method steps in any order falls within the scope of the present disclosure.

At step 602, the compositing application 132 receives a video frame from a device, such as video capture device 110 or matting device 102. The video frame may be part of a video feed comprising a series of video frames, where each video frame is composed of red, green, and blue color channels. The compositing application 132 may receive each video frame in the video feed in real-time, as the video frame is captured.

At step 604, the compositing application 132 receives an image mask and a depth estimate corresponding to the video frame received at step 602. In some implementations, the image mask and the depth estimate may be generated according to the method steps outlined in diagram 500 of FIG. 5. As discussed above, the image mask and the depth estimate are generated using one or more machine learning models. The depth estimate corresponding to a given video frame indicates the depth of one or more objects depicted in the video frame (e.g., a person) relative to the scene depicted in the video frame. The image mask corresponding to the given video frame indicates the portion(s) of the corresponding video frame that depict the one or more objects.

At step 606, the compositing application 132 determines the location of a CG element for placement in the video frame based on the depth estimate and the image mask corresponding to the video frame. The location of the CG element is determined relative to one or more objects within the scene depicted in the video frame. At step 608, the compositing application 132 combines the CG element with the video frame based on the location determined at step 606.

In sum, a matting system includes a computing device communicatively coupled to a video capture device, such as a high-definition film-making camera. The computing device includes one or more machine learning models that are trained to receive a video sequence (i.e., a video feed) and generate output indicating the image mask and the depth of a objects depicted in the video sequence. While capturing a video, the video capture device transmits the captured video feed to the computing device. The computing device inputs the video feed to the one or more machine learning models to generate an image mask feed of the image masks and a depth estimation feed of the depths of objects depicted in the captured video feed. The image mask feed and the depth estimation feed are transmitted to a compositing device or application. The compositing device or application receives the captured video feed, the image mask feed, the depth estimation feed, and one or more computer-generated elements, and combines the captured video feed with the one or more computer-generated elements based on the image mask feed and the depth estimation feed to generate a composite video. The composite video may be transmitted to a display as a composite video feed.

At least one technical advantage of the disclosed techniques relative to the prior art is that the disclosed techniques can more effectively compose live-action video with computer-generated elements. In particular, by inputting a live-action video feed into a trained machine learning model, a matting system is able to generate a corresponding image mask and depth estimate feed in real-time. As a result, using the disclosed techniques, the matting system is able to generate a composite video that combines the live-action video feed with computer-generated elements in real-time while the live-action video feed is being captured. Accordingly, as filmmakers are filming a scene, the filmmakers have an opportunity to view the composite video in real-time, enabling, among other things, the filmmaker to make adjustments in real-time to the scene.

Additionally, in contrast to prior approaches that utilize specialized equipment, additional cameras, and equipment or software calibration in order to generate the composite video, the matting system can include only the computing device on which the trained machine learning model is executing. Accordingly, the matting system can be flexibly and easily used in conjunction with different production setups.

1. A computer-implemented method for compositing video frames with one or more compute-generated elements that comprises receiving a video feed comprising a plurality of temporally ordered video frames as the video frames are captured by a video capture device, generating, using one or more machine learning models, an image mask corresponding to each video frame included in the video feed and a depth estimate corresponding to each video frame included in the video feed, and for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

2. The computer-implemented method of clause 1, wherein a first depth estimate corresponding to a given video frame indicates a depth of one or more objects depicted in the video frame relative to a scene depicted in the video frame.

3. The computer-implemented method of clause 1 or 2, wherein a first image mask corresponding to the given video frame indicates one or more portions of the given video frame that depict the one or more objects.

4. The computer-implemented method of any of clauses 1-3, wherein the one or more machine learning models are trained on a training data set comprising video frames and corresponding depth estimates and image masks.

5. The computer-implemented method of any of clauses 1-4, wherein the one or more machine learning models comprises (i) a first machine learning model that is trained to generate, for a given video frame, a corresponding depth estimate, and (ii) a second machine learning model that is trained to generate, for the given video frame, a corresponding image mask.

6. The computer-implemented method of any of clauses 1-5, wherein the one or more machine learning models comprises a first machine learning model that is trained to generate, for a given video frame, a corresponding depth estimate and a corresponding image mask.

7. The computer-implemented method of any of clauses 1-6, wherein generating the image mask and the depth estimate comprises performing one or more post-processing operations on an initial image mask and an initial depth estimate outputted by the one or more machine learning models.

8. The computer-implemented method of any of clauses 1-7, wherein, for each video frame in the video feed, transmitting the video frame, the corresponding image mask, and the corresponding depth estimate comprises inputting the corresponding image mask in an image mask feed coupled to the compositing system and inputting the corresponding depth estimate in a depth estimate feed coupled to the compositing system.

9. The computer-implemented method of any of clauses 1-8, wherein the compositing system composites the computer-generated element with the video frame by determining a location for placing the computer-generated element in the frame based on the corresponding image mask and the corresponding depth estimate.

10. One or more non-transitory computer-readable media storing instructions that, when executed by one or more processors cause the one or more processors to perform the steps of receiving a video feed comprising a plurality of temporally ordered video frames as the video frames are captured by a video capture device, generating, using one or more machine learning models, an image mask corresponding to each video frame included in the video feed and a depth estimate corresponding to each video frame included in the video feed, and, for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

11. The one or more non-transitory computer readable media of clause 10, wherein a first depth estimate corresponding to a given video frame indicates a depth of one or more objects depicted in the video frame relative to a scene depicted in the video frame.

12. The one or more non-transitory computer readable media of clauses 10 or 11, wherein a first image mask corresponding to the given video frame indicates one or more portions of the given video frame that depict the one or more objects.

13. The one or more non-transitory computer readable media of any of clauses 10-12, wherein the one or more machine learning models are trained on a training data set comprising video frames and corresponding depth estimates and image masks.

14. The one or more non-transitory computer readable media of any of clauses 10-13, wherein the one or more machine learning models comprises (i) a first machine learning model that is trained to generate, for a given video frame, a corresponding depth estimate, and (ii) a second machine learning model that is trained to generate, for the given video frame, a corresponding image mask.

15. The one or more non-transitory computer readable media of any of clauses 10-14, wherein the one or more machine learning models comprises a first machine learning model that is trained to generate, for a given video frame, a corresponding depth estimate and a corresponding image mask.

16. The one or more non-transitory computer readable media of any of clauses 10-15, wherein generating the image mask and the depth estimate comprises performing one or more post-processing operations on an initial image mask and an initial depth estimate outputted by the one or more machine learning models.

17. The one or more non-transitory computer readable media any of clauses 10-16, wherein, for each video frame in the video feed, transmitting the video frame, the corresponding image mask, and the corresponding depth estimate comprises inputting the corresponding image mask in an image mask feed coupled to the compositing system and inputting the corresponding depth estimate in a depth estimate feed coupled to the compositing system.

18. The one or more non-transitory computer readable media of any of clauses 10-17, wherein the compositing system composites the computer-generated element with the video frame by determining a location for placing the computer-generated element in the video frame based on the corresponding image mask and the corresponding depth estimate.

19. A system, comprising a memory storing instructions and one or more processors to: receive a video feed comprising a plurality of temporally ordered video frames as the video frames are captured by a video capture device, generate, using one or more machine learning models, an image mask corresponding to each video frame included in the video feed and a depth estimate corresponding to each video frame included in the video feed, and, for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

20. The system of clause 19, wherein the one or more machine learning models are trained on a training data set comprising video frames and corresponding depth estimates and image masks.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for compositing video frames with one or more computer-generated elements, the method comprising:

receiving a video feed comprising a plurality of temporally ordered video frames as the video frames are captured by a video capture device;

generating, using one or more machine learning models, an image mask corresponding to each video frame included in the video feed and a depth estimate corresponding to each video frame included in the video feed; and for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

2. The computer-implemented method of claim 1, wherein a first depth estimate corresponding to a given video frame indicates a depth of one or more objects depicted in the video frame relative to a scene depicted in the video frame.

3. The computer-implemented method of claim 2, wherein a first image mask corresponding to the given video frame indicates one or more portions of the given video frame that depict the one or more objects.

4. The computer-implemented method of claim 1, wherein the one or more machine learning models are trained on a training data set comprising video frames and corresponding depth estimates and image masks.

5. The computer-implemented method of claim 1, wherein the one or more machine learning models comprises (i) a first machine learning model that is trained to generate, for a given video frame, a corresponding depth estimate, and (ii) a second machine learning model that is trained to generate, for the given video frame, a corresponding image mask.

6. The computer-implemented method of claim 1, wherein the one or more machine learning models comprises a first machine learning model that is trained to generate, for a given video frame, a corresponding depth estimate and a corresponding image mask.

7. The computer-implemented method of claim 1, wherein generating the image mask and the depth estimate comprises performing one or more post-processing operations on an initial image mask and an initial depth estimate outputted by the one or more machine learning models.

8. The computer-implemented method of claim 1, wherein, for each video frame in the video feed, transmitting the video frame, the corresponding image mask, and the corresponding depth estimate comprises inputting the corresponding image mask in an image mask feed coupled to the compositing system and inputting the corresponding depth estimate in a depth estimate feed coupled to the compositing system.

9. The computer-implemented method of claim 1, wherein the compositing system composites the computer-generated element with the video frame by determining a location for placing the computer-generated element in the frame based on the corresponding image mask and the corresponding depth estimate.

10. One or more non-transitory computer-readable media storing instructions that, when executed by one or more processors cause the one or more processors to perform the steps of:

receiving a video feed comprising a plurality of temporally ordered video frames as the video frames are captured by a video capture device;

generating, using one or more machine learning models, an image mask corresponding to each video frame included in the video feed and a depth estimate corresponding to each video frame included in the video feed; and for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

11. The one or more non-transitory computer readable media of claim 10, wherein a first depth estimate corresponding to a given video frame indicates a depth of one or more objects depicted in the video frame relative to a scene depicted in the video frame.

12. The one or more non-transitory computer readable media of claim 11, wherein a first image mask corresponding to the given video frame indicates one or more portions of the given video frame that depict the one or more objects.

13. The one or more non-transitory computer readable media of claim 10, wherein the one or more machine learning models are trained on a training data set comprising video frames and corresponding depth estimates and image masks.

14. The one or more non-transitory computer readable media of claim 10, wherein the one or more machine learning models comprises (i) a first machine learning model that is trained to generate, for a given video frame, a corresponding depth estimate, and (ii) a second machine learning model that is trained to generate, for the given video frame, a corresponding image mask.

15. The one or more non-transitory computer readable media of claim 10, wherein the one or more machine learning models comprises a first machine learning model that is trained to generate, for a given video frame, a corresponding depth estimate and a corresponding image mask.

16. The one or more non-transitory computer readable media of claim 10, wherein generating the image mask and the depth estimate comprises performing one or more post-processing operations on an initial image mask and an initial depth estimate outputted by the one or more machine learning models.

17. The one or more non-transitory computer readable media of claim 10, wherein, for each video frame in the video feed, transmitting the video frame, the corresponding image mask, and the corresponding depth estimate comprises inputting the corresponding image mask in an image mask feed coupled to the compositing system and inputting the corresponding depth estimate in a depth estimate feed coupled to the compositing system.

18. The one or more non-transitory computer readable media of claim 10, wherein the compositing system composites the computer-generated element with the video frame by determining a location for placing the computer-generated element in the video frame based on the corresponding image mask and the corresponding depth estimate.

19. A system, comprising:

a memory storing instructions; and one or more processors to:

receive a video feed comprising a plurality of temporally ordered video frames as the video frames are captured by a video capture device;

generate, using one or more machine learning models, an image mask corresponding to each video frame included in the video feed and a depth estimate corresponding to each video frame included in the video feed; and for each video frame in the video feed, transmitting, in real-time, the video frame, the corresponding image mask, and the corresponding depth estimate to a compositing system, wherein the compositing system is configured to composite a computer-generated element with the video frame based on the corresponding image mask and the corresponding depth estimate.

20. The system of claim 19, wherein the one or more machine learning models are trained on a training data set comprising video frames and corresponding depth estimates and image masks.

* * * * *